United States Patent
Jacobson

(10) Patent No.: US 7,062,702 B2
(45) Date of Patent: Jun. 13, 2006

(54) EFFICIENT PARITY OPERATIONS

(75) Inventor: Michael B. Jacobson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 09/808,710

(22) Filed: Mar. 14, 2001

(65) Prior Publication Data

US 2002/0166077 A1 Nov. 7, 2002

(51) Int. Cl.
*G06F 11/00* (2006.01)

(52) U.S. Cl. ........................................ 714/800
(58) Field of Classification Search ................. 714/800, 714/801, 803, 804, 802, 805, 806, 746, 762; 365/230.03
See application file for complete search history.

(56) References Cited

U.S. PATENT DOCUMENTS

| | | | |
|---|---|---|---|
| 4,433,388 A | 2/1984 | Oosterbaan | |
| 4,996,690 A | 2/1991 | George et al. | |
| 5,134,619 A | 7/1992 | Henson et al. | |
| 5,253,352 A | 10/1993 | Olson | |
| 5,278,984 A | 1/1994 | Batchelor | |
| 5,333,143 A | 7/1994 | Blaum et al. | |
| 5,369,652 A | 11/1994 | Bailey et al. | |
| 5,404,495 A | 4/1995 | Yoneda | |
| 5,463,643 A | 10/1995 | Gaskins et al. | |
| 5,477,551 A | 12/1995 | Parks et al. | |
| 5,499,337 A | 3/1996 | Gordon | |
| 5,517,514 A | 5/1996 | Norrie et al. | |
| 5,588,134 A | 12/1996 | Oneto et al. | |
| 5,734,859 A | 3/1998 | Yorimitsu et al. | |
| 5,748,901 A | 5/1998 | Afek et al. | |
| 5,796,735 A | 8/1998 | Miller et al. | |
| 5,819,109 A | * 10/1998 | Davis | 710/15 |
| 5,893,162 A | 4/1999 | Lau et al. | |
| 5,937,205 A | 8/1999 | Mattson et al. | |
| 5,938,723 A | 8/1999 | Hales, II et al. | |
| 5,948,081 A | 9/1999 | Foster | |
| 5,954,822 A | 9/1999 | Yashiro et al. | |
| 6,092,158 A | 7/2000 | Harriman et al. | |
| 6,151,641 A | 11/2000 | Herbert | |
| 6,175,889 B1 | 1/2001 | Olarig | |
| 6,279,087 B1 | 8/2001 | Melo et al. | |
| 6,317,806 B1 | 11/2001 | Audityan et al. | |
| 6,341,342 B1 | 1/2002 | Thompson et al. | |
| 6,496,740 B1 | 12/2002 | Robertson et al. | |
| 6,523,060 B1 | 2/2003 | Kao | |
| 6,523,087 B1 | 2/2003 | Busser | |
| 6,567,891 B1 | 5/2003 | Oldfield et al. | |
| 6,594,796 B1 * | 7/2003 | Chiang | 714/800 |
| 6,687,872 B1 | 2/2004 | Oldfield et al. | |
| 2002/0023240 A1 | 2/2002 | Yamamoto et al. | |
| 2002/0133783 A1 | 9/2002 | Oldfield et al. | |
| 2002/0166077 A1 | 11/2002 | Jacobson | |

* cited by examiner

Primary Examiner—Albert Decady
Assistant Examiner—James C. Kerveros

(57) ABSTRACT

A disk controller includes memory that is accessible by both a microprocessor and hardware parity logic. Parity-related operations are identified by scenario, and parity coefficient subsets are stored in a memory table for each different parity-related calculation scenario. To perform a particular parity-related operation, the microprocessor determines the operation's scenario and identifies the corresponding coefficient subset. The hardware parity logic is then instructed to perform the appropriate parity computation, using the identified coefficient subset.

13 Claims, 3 Drawing Sheets

EFFICIENT PARITY OPERATIONS

TECHNICAL FIELD

This invention relates to parity operations in redundant disk drive systems, and particularly to parity operations in such systems that utilize two or more parity segments per storage stripe.

BACKGROUND OF THE INVENTION

Modern, high-capacity data storage systems often utilize a plurality of physical disk drives for redundant storage of data. This arrangement speeds data access as well as protects against data loss that might result from the failure of any single disk.

There are two common methods of storing redundant data. According to the first or "mirror" method, data is duplicated and stored on two separate areas of the storage system. In a disk array, for example, identical data is stored on two separate disks. This method has the advantages of high performance and high data availability. However, the mirror method is also relatively expensive, effectively doubling the cost of storing data.

In the second or "parity" method, a portion of the storage area is used to store redundant data, but the size of the redundant storage area is less than the remaining storage space used to store the original data. For example, in a disk array having six disks, five disks might be used to store data, with the sixth disk being dedicated to storing redundant data, which is referred to as "parity" data. The parity data allows reconstruction of the data from one data disk, using the parity data in conjunction with the data from surviving disks. The parity method is advantageous because it is less costly than the mirror method, but it also has lower performance and availability characteristics in comparison to the mirror method.

One aspect of this invention involves storing redundant data according to parity techniques. In conventional disk arrays utilizing parity storage, the space on the storage disks are configured into multiple storage stripes, where each storage stripe extends across the storage disks. Each stripe consists of multiple segments of storage space, where each segment is that portion of the stripe that resides on a single storage disk of the disk array.

FIG. 1 illustrates a conventional disk array 12 having six storage disks 13. In this simplified example, there are five storage stripes extending across the storage disks. FIG. 1 highlights data and storage segments of a single one of these five stripes. Data segments of the indicated stripe are indicated by cross-hatching. The corresponding parity segment of this same stripe is illustrated in solid black. Generally, of the six segments comprising any given stripe, five of the segments are data segments and the sixth segment is a parity segment.

This type of parity storage is referred to as 5+1 parity storage, indicating that there are five data segments for every single parity segment. This scheme is more generally referred to as N+1 grouping, where N is the actual number of data segments in a data stripe.

N+1 redundancy grouping such as illustrated in FIG. 1 protects against the loss of any single physical storage device. If the storage device fails, its data can be reconstructed from the surviving data. The calculations performed to recover the data are straightforward, and are well-known. Generally, a single parity segment P is calculated from data segments $D_0$ through $D_{N-1}$ in accordance with the following equation:

$$P = x_0 + x_1 + x_2 + x_{N-1}$$

where $x_0$ through $x_{N-1}$ correspond to the data from data segments $D_0$ through $D_{N-1}$. After the loss of any single data segment, its data can be recovered through a straightforward variation of the same equation.

In many systems, however, it is becoming important to protect against the loss of more than a single storage device. Thus, it is becoming necessary to implement N+2 grouping in redundant storage systems.

While N+2 redundancy grouping enhances data protection, it also involves more complex calculations—both in initially calculating parity segments and in reconstructing any lost data segments.

A general form of the N+2 parity computation is as follows:

$$P = p_0 x_0 + p_1 x_1 + p_2 x_2 + p_{N-1} x_{N-1}$$

$$Q = q_0 x_0 + q_1 x_1 + q_2 x_2 + q_{N-1} x_{N-1}$$

where:

P is the value of a first parity segment;

Q is the value of a second parity segment;

$x_0$ through $x_{N-1}$ are the values of the data segments $p_0$ through $p_{N-1}$ and $q_0$ through $q_{N-1}$ are constant coefficients that are particular to a given parity scheme.

These equations form a two-equation system that, by the rules of linear algebra, can potentially solve for any two unknowns $x_a$ through $x_b$ which represent the data from a single stripe of any two failed storage devices. One requirement is that the two sets of coefficients $p_i$ and $q_i$ be linearly independent. This requirement is met, for example, if $p_0=1$, $p_1=1$, $p_2=1$; etc.; and $q_0=1$, $q_1=2$, $q_2=3$; etc. Other examples are also possible.

The mathematics of N+2 parity are well-known and are not the primary subject of this description. However, it is apparent from the brief description given above that N+2 parity computations are significantly more complex than N+1 parity computations. In actual implementations of N+2 disk arrays, this complexity threatens to limit the data throughput of storage device controllers and, consequently, of the overall disk array.

This invention includes methods and means for maintaining adequate data throughput in spite of the added complexity resulting from N+2 parity calculations.

SUMMARY

In accordance with one aspect of the invention, every possible parity-related computation is identified as a different scenario. A coefficient subset is selected or computed for each different scenario and stored in a memory table during an initialization process. To perform a particular operation, its scenario is identified and the corresponding coefficient subset is located. Hardware logic is then instructed to perform the actual parity operation, using the identified coefficient subset. This allows very efficient computations, using coefficients that are computed and selected ahead of time.

DETAILED DESCRIPTION

Parity Operations

Figure 1:
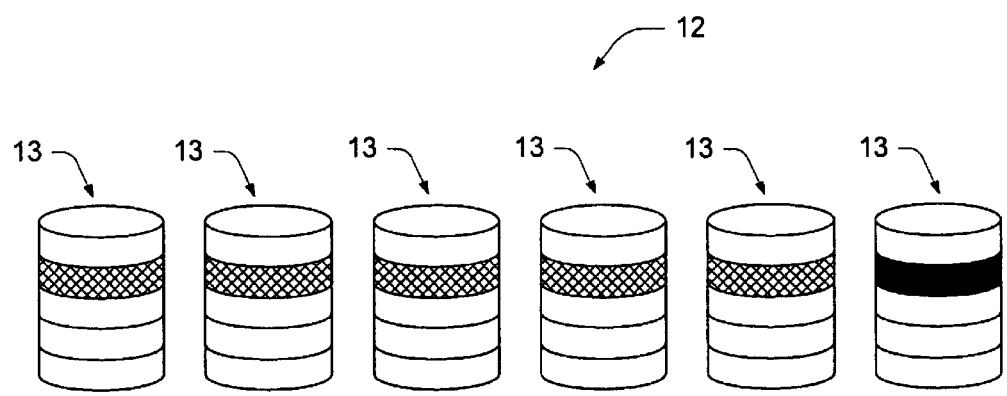
FIG. 1 is a block diagram showing N+1 redundancy grouping in accordance with the prior art.
Figure 2:
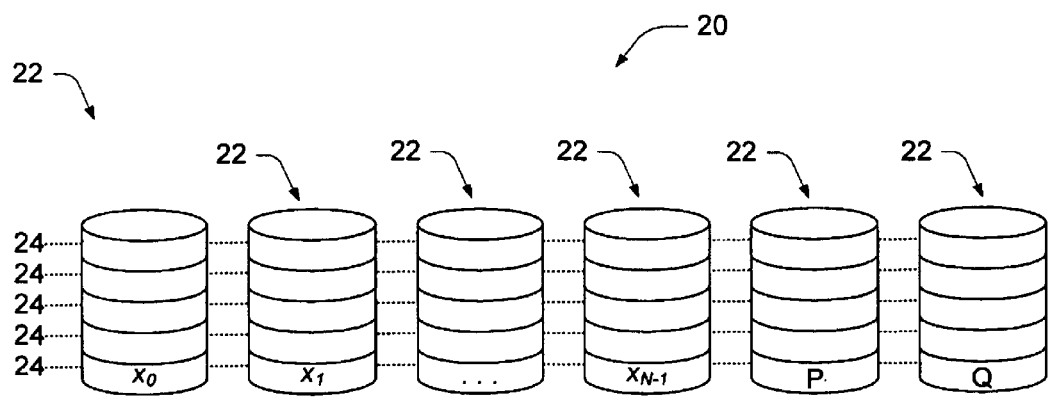
FIG. 2 is a block diagram showing N+2 redundancy grouping as used in the described embodiment of the invention.

Referring to FIG. 2, a redundant data storage system 20 in accordance with the invention utilizes storage disks 22 with data stripes 24. Each data stripe 24 comprises a plurality of data segments $x_0$ through $x_{N-1}$ and at least two corresponding parity segments P and Q. P and Q are derived from the data segments $x_0$ through $x_{N-1}$, from a first set of parity coefficients $p_0$ through $p_{N-1}$, and from a second set of parity coefficients $q_0$ through $q_{N-1}$. The parity coefficients correspond to respective data segments in accordance with the equations below:

$$P = p_0 x_0 + p_1 x_1 + p_2 x_2 + p_{N-1} x_{N-1}$$

$$Q = q_0 x_0 + q_1 x_1 + q_2 x_2 + q_{N-1} x_{N-1}$$

In accordance with the invention, parity operations are generally classified as parity segment generation operations, parity segment regeneration operations, and data segment reconstruction operations.

A parity segment generation operation is performed when creating a new data stripe—the parity segments are created based on completely new data.

A parity segment regeneration operation is performed with respect to an existing stripe, either when new data causes the addition of a new data segment or when a read/modify/write cycle modifies one or more data segments. In a parity segment regeneration operation, the parity segments are modified incrementally, without reading an entire data stripe. For example, suppose that new data causes the addition of a new data segment $x_4$. $P_{NEW}$ is calculated as follows:

$$P_{NEW} = P_{OLD} + p_4 x_4$$

Similarly, suppose that data segment $x_2$ is modified as the result of a read/modify/write cycle. In this case, $P_{NEW}$ is calculated as follows:

$$P_{NEW} = P_{OLD} - p_2 x_{2OLD} + p_2 x_{2NEW}$$

Calculating new P and Q values from the old data segment values involves significantly fewer memory reads than calculating P and Q from scratch after every stripe modification.

In accordance with the invention, parity segment regeneration operations are further classified as either parity regenerations resulting from added data segments or parity regenerations resulting from a modified data segment.

Data segment reconstruction operations include two sub-classifications: single data segment reconstruction operations and double data segment reconstruction operations. A single data segment can be reconstructed from either the P or the Q parity segment in combination with the surviving data segments. Generally, a data segment $x_a$ is reconstructed from either parity segment P or Q as follows:

$$x_a = f(p_0, p_a)x_0 + f(p_1, p_a)x_1 + \ldots + f(p_a)P + \ldots + f(p_{N-1}, p_a)x_{N-1}$$

$$x_a = f(q_0, q_a)X_0 + f(q_1, q_a)x_1 + \ldots + f(q_a)Q + \ldots + f(q_{N-1}, q_a)x_{N-1}$$

where f( ) is a transformation function that generates an appropriate coefficient particular to the parity generation code being used.

One implementation of these equations is as follows:

$$x_a = p_a^{-1}(p_0 x_0 + p_1 x_1 + \ldots + P + \ldots + p_{N-1} x_{N-1})$$

$$x_a = p_a^{-1}(q_0 x_0 + q x_1 + \ldots + Q + \ldots + q_{N-1} x_{N-1})$$

Two data segments can be reconstructed from the P and the Q parity segments in combination with the surviving data segments. Generally, two data segments $x_a$ and $x_b$ are reconstructed from parity segments P and Q as follows:

$$x_a = f(p_0, q_0, p_a, p_b, q_a, q_b)x_0 + f(p_1, q_1, p_a, p_b, q_a, q_b)x_1 +$$
$$\ldots + f(p_a, p_b, q_a, q_b)P + f(p_k, q_k, p_a, p_b, q_a, q_b)x_k +$$
$$f(p_{k+1}, q_{k+1}, p_a, p_b, q_a, q_b)x_{k+1} + \ldots + f(p_a, p_b, q_a, q_b)Q +$$
$$\ldots + f(p_{N-1}, q_{N-1}, p_a, p_b, q_a, q_b)x_{N-1}$$

$$x_b = f(p_0, q_0, p_a, p_b, q_a, q_b)x_0 + f(p_1, q_1, p_a, p_b, q_a, q_b)x_1 +$$
$$f(p_a, p_b, q_a, q_b)P + f(p_k, q_k, p_a, p_b, q_a, q_b)x_k +$$
$$f(p_{k+1}, q_{k+1}, p_a, p_b, q_a, q_b)x_{k+1} + \ldots +$$
$$f(p_a, p_b, q_a, q_b)Q + \ldots + f(p_{N-1}, q_{N-1}, p_a, p_b, q_a, q_b)x_{N-1}$$

where f( ), again, is a transformation function that generates an appropriate coefficient particular to the parity generation code being used.

One implementation of these equations is as follows:

$$x_a = (p, q_b + p_b q_a)^{-1}((q_b p_0 + p_b q_0)x_0 + (q_0 p_1 + p_0 q_1)x_1 + \ldots +$$
$$q_b P + \ldots + (q_b p_k + p_b q_k)x_k + (q_b p_{k-1} + p_b q_{k+1})x_{k+1} +$$
$$\ldots + p_b Q + \ldots + (q_b p_{N-1} + p_b q_{N-1})x_{N-1})$$

$$x_b = (p_a q_b + p_b q_a)^{-1}((q_a p_0 + p_a q_0)x_0 + (q_a p_1 + p_a q_1)x_1 + \ldots +$$
$$q_a P + \ldots + (q_a p_k + p_a q_k)x_k + (q_a p_{k-1} + p_a q_{k+1})x_{k+1} +$$
$$\ldots + p_a Q + \ldots + (q_a p_{N-1} + p_a q_{N-1})x_{N-1})$$

Generally, all of the parity operations described above can be accomplished by using a different combination of known coefficients chosen from a base set having a finite number of such coefficients. These coefficients include $p_0$–$p_{N-1}$, $q_0$–$q_{N-1}$, and the coefficients resulting from the transform functions f( ). Any particular parity operation utilizes a subset of these coefficients, depending on the actual data or parity segment being calculated. The particular subset of coefficients needed for a particular calculation depends on both the classification of the operation and upon the specific data and/or parity segments involved. Thus, within a given classification of a parity operation, there are different situations or scenarios, each of which calls for a different subset of coefficients. For example, one scenario occurs when adding data segment $x_5$ to a stripe, when coefficients $p_5$ and $q_5$ are needed. Another scenario occurs when adding data segment $x_6$ to a stripe, when coefficients $p_6$ and $q_6$ are needed.

Coefficient Subsets

Figure 3:
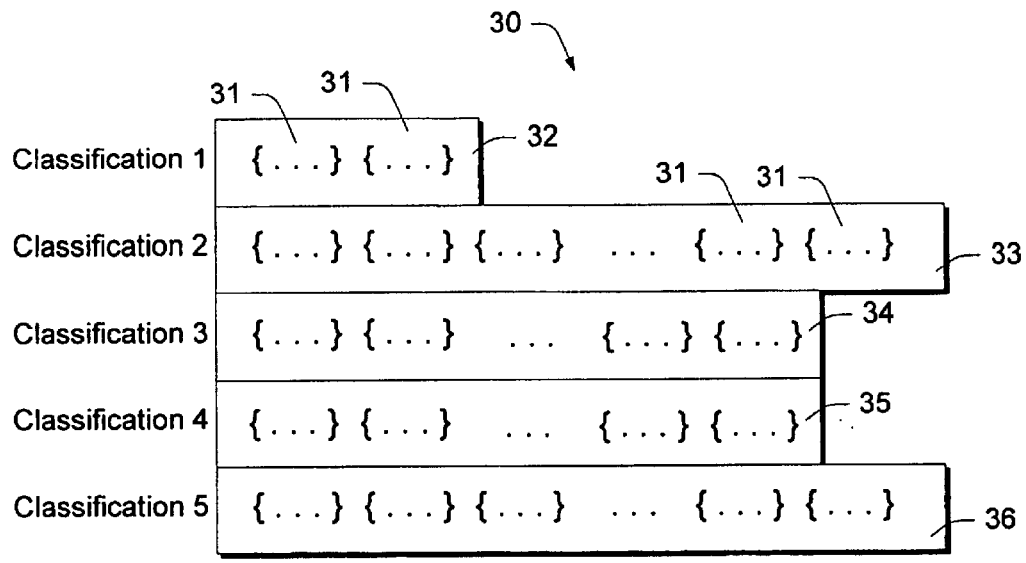
FIG. 3 is a block diagram illustrating layout of a memory table in accordance with the invention.

FIG. 3 shows a memory array 30 that contains a plurality of coefficient subsets 31. Each coefficient subset is a list or concatenation of pre-selected and/or pre-computed coefficients that are applied to corresponding segments of data to produce a parity computation result. In accordance with the invention, a different subset of coefficients is pre-selected and stored for each different operation scenario. The subsets are then formatted and packed in a linear memory array for reference and direct use by parity operation logic. Because different scenarios call for different numbers of coefficients, the subsets are not of the same length or size.

Each coefficient is a single byte in the described embodiment of the invention. The term "packed" means that the subsets or strings of coefficients are concatenated in linear memory, preferably with no intervening unused spaces, to conserve storage space.

There is a one-to-one correspondence between a coefficient in a subset and a segment of data (either a data segment or a parity segment) when performing the parity operation. Each coefficient is applied only to its corresponding data segment or parity segment to produce the result of the operation.

One coefficient subset is included in the array for each possible parity computation case or scenario. Unique indexing formulas are used to locate the beginning of a subset in the array for each specific computational scenario. Generally, the subsets are arranged in pairs, corresponding to computations involving P and Q, respectively.

Referring to FIG. 3, memory array 30 includes a plurality of classification groups 32, 33, 34, 35, and 36, each of which contains the coefficient subsets 31 corresponding to a particular parity operation classification. Each subset in a classification group has coefficients for a specific scenario that occurs within the group's classification. With one exception, the coefficient subsets are the same size within any given classification group.

Within array 30, particular classification groups are located by computing a group offset from the beginning of the array to the beginning of the group. This group offset is the base index into the array for the group. To locate a specific coefficient subset within a classification group, a subset offset from the beginning of the group is added to the base index. This produces an index into the array that locates the beginning of the desired coefficient subset.

In accordance with one embodiment of the invention, the general parity operation classifications are defined as follows:

1. Parity Generation Operations—Partial or full new stripe that has no pre-existing data or parity.
2. Parity Regeneration Operations Resulting From Added Segments—Incremental growth of a stripe by incorporating new data segments into the two parity segments.
3. Parity Regeneration Operations Resulting From Segment Modification—Modification of a data segment that is already incorporated in the two parity segments (read/modify/write).
4. Single Data Segment Reconstruction—Reconstruction of a single data segment using one of the parity segments and the surviving data segments from the strip. Reconstruction from either P or Q parity segments is supported because in the case of two failed storage devices, one of the failed storage devices may hold P or Q.
5. Double Data Segment Reconstruction—Reconstruction of two data segments of a stripe using the two parity segments P and Q. and the surviving data segments from the stripe.

Structure of Classification 1 Coefficient Subsets

The first classification group 32 of the array contains the coefficient subsets for parity generation operations. A parity generation operation generates new P and Q segments from new data segments $x_0$ through $x_{N-1}$. There are only two coefficient subsets in this classification group. The subsets correspond respectively to the generation of parity segments P and Q:

P: $\{p_0, p_1, \ldots p_{N-1}\}$ and

Q: $\{q_0, q_1, \ldots q_{N-1}\}$

Each of these subsets is the same length (N).

Structure of Classification 2 Coefficient Subsets

The second classification group 33 of the array contains the coefficient subsets for parity operations that add incrementally to a stripe. This type of operation updates P and Q segments in combination with any given contiguous range of new or added data segments $x_a$ through $x_b$ (where b<N and a<=b). There are multiple different scenarios of these operations, corresponding to every possible range a through b of data segments within data segments 0 through N−1. Each scenario calls for a different subset of coefficients. For example, if the new or added data segments are $x_3$ and $x_4$, the required coefficient subset to calculate P is $\{p_3, p_4\}$. If the new or added data segments are $x_2$ through $x_5$, the required coefficient subset to calculate P is $\{p_2, p_3, p_4, p_5\}$. The total of possible ranges within data segments 0 through N−1 depends on the value of N.

Each coefficient subset of classification group 2 contains two initial parameters that indicate whether the subset applies to calculations of P or to calculations of Q. Each of these initial parameters is set to either "0" or "1". A value of "1" for the first of these coefficients indicates that the calculation involves parity segment P. A value of "1" for the second of these coefficients indicates that the calculation involves parity segment Q. Only one of these two parameters should be set equal to "1" at any given time.

The remaining coefficients in a Classification 2 subset are the sub-range of coefficients that are used to regenerate P and Q from newly added data stripes. Thus, the classification group contains a plurality of coefficient subsets of the form:

P: $\{1, 0, p_a, \ldots p_b\}$ and

Q: $\{0, 1, q_a, \ldots q_b\}$

Classification group 33 includes a plurality of subsets such as these, depending on N, corresponding to every range of a through b, within the larger range of 0 through N−1. The coefficient subsets in this section of the array have varying lengths or sizes, equal to b−a for each operation scenario.

Within this classification group, coefficient subsets are arranged and grouped by length. That is, the coefficient subsets containing the smallest number of coefficients are placed in the initial part of the classification group. The coefficient subsets containing the largest number of coefficients are placed at the end of the classification group. Within each of these groupings, the coefficient subsets are arranged in order according to the lower coefficient subscript of the range that is covered by the coefficient subset. Thus, the subsets having a=0 are positioned first, the subsets having a=1 next, and so on.

Structure of Classification 3 Coefficient Subsets

The coefficient subsets in the third classification group 34 are used to update P and Q when a single data segment is modified. This type of operation updates P and Q segments, given a modified data segment $x_a$.

As with the Classification 2 group, the first two parameters of each Classification 3 subset indicate whether the coefficients of the group are applicable to P calculations or to Q calculations. Each of these coefficients is set to either "0" or "1". A value of "1" for the first of these coefficients indicates that the subset coefficients apply to parity segment P. A value of "1" for the second of these coefficients indicates that the subset coefficients apply to parity segment Q.

Each subset contains a single remaining coefficient, corresponding to the data segment $x_a$ that is being modified:

P: $\{1, 0, p_a\}$ and

Q: $\{0, 1, q_a\}$

The third classification group 34 includes N pairs of such subsets, corresponding to all values of a from 0 through N−1. Note that these subsets correspond to a special case of the Classification 2 coefficient subsets, in which a=b, and can therefore be used when adding a single new data segment to a stripe.

Structure of Classification 4 Coefficient Subsets

The coefficient subsets in the fourth classification group 35 are used to reconstruct a single data segment $X_a$ based on one of the parity segments and the surviving data segments.

The coefficients correspond closely to the Classification 1 coefficients, except that they are transformed according to the mathematics (f( )) of the chosen error correction code to perform a reconstruction operation:

$$P: \{f(p_0, p_a), f(p_1, p_a), \ldots, f(p_a), \ldots, f(p_{N-1}, p_a)\}$$

$$Q: \{f(q_0, q_a), f(q_1, q_a), \ldots, f(q_a), \ldots, f(q_{N-1}, q_a)\}$$

More specifically:

$$P: (p, q_b + p_b q_a)^{-1}$$
$$((q_b p_0 + p_b q_0), (q_0 p_1 + p_0 q_1), \ldots, q_b P, \ldots, (q_b p_k + p_b q_k),$$
$$(q_b p_{k-1} + p_b q_{k+1}), \ldots, p_b Q + \ldots + (q_b p_{N-1} + p_b q_{N-1}))$$

$$P: (p_a q_b + p_b q_a)^{-1}((q_a p_0 + p_a q_0), (q_a p_1 + p_a q_1), \ldots,$$
$$q_a P + \ldots + (q_a p_k + p_a q_k), (q_a p_{k-1} + p_a q_{k+1}),$$
$$\ldots, p_a Q, \ldots, (q_a p_{N-1} + p_a q_{N-1}))$$

The fourth classification group includes N pairs of such subsets, corresponding to all values of a from 0 through N−1. Note that in each subset, the coefficient $f(P_a)$ or $f(q_a)$ corresponds to data segment $x_a$.

Structure of Classification 5 Coefficient Subsets

The coefficient subsets in the fifth classification group 36 are used to reconstruct two data segments $x_a$ and $x_b$ based on the two parity segments and the surviving data segments. The coefficients correspond closely to the Classification 1 coefficients, except that they are transformed according to the mathematics (f( )) of the chosen error correction code to perform a reconstruction operation:

$$x_a: \{f(p_0, q_0, p_a, p_b, q_a, q_b),$$
$$f(p_1, q_1, p_a, p_b, q_a, q_b), \ldots, f(p_a, p_b, q_a, q_b), \ldots,$$
$$f(p_k, q_k, p_a, p_b, q_a, q_b), f(p_{k+1}, q_{k+1}, p_a, p_b, q_a, q_b),$$
$$\ldots, f(p_a, p_0, q_a, q_b), \ldots, f(p_{N-1}, q_{N-1}, p_a, p_b, q_a, q_b)\}$$

$$x_b: \{f(p_0, q_0, p_a, p_b, q_a, q_b), f(p_1, q_1, p_a, p_b, q_a, q_b),$$
$$\ldots, f(p_a, p_b, q_a, q_b), \ldots, f(p_k, q_k, p_a, p_b, q_a, q_b),$$
$$f(p_{k+1}, q_{k+1}, p_a, p_b, q_a, q_b), \ldots, f(p_a, p_0, q_a, q_b),$$
$$\ldots, f(p_{N-1}, q_{N-1}, p_a, p_b, q_a, q_b)\}$$

The fifth section of the array includes (N*(N−1))/2 pairs of such subsets, corresponding to every possible combination of a and b within the range of 0 to N−1. Note that in each subset, the coefficient $f(p_a, P_b, q_a, q_b)$ corresponds to data segment $X_a$ or $X_b$, depending on which data segment is being reconstructed.

One possible implementation of these equations is as follows:

$$x_a: (p_a, q_b + p_b, q_a)^{-1}(q_b, p_0 + p_b, q_0),$$
$$(p_a, q_b + p_b, q_a)^{-1}(q_b, p_1 + p_b, q_1), \ldots,$$
$$(p_a, q_b + p_b, q_a)^{-1} q_b, \ldots, (p_a, q_b + p_b, q_a)^{-1}(q_0, p_k + p_0, q_k),$$
$$(p_a, q_b + p_b, q_a)^{-1}(q_0, p_{k+1} + p_0, q_{k+1}), \ldots, (p_a, q_b + p_b, q_a)^{-1} p_b,$$
$$\ldots, (p_a, q_b + p_b, q_a)^{-1}(q_0, p_{N-1} + p_0, q_{N-1})$$

$$x_b: (p_a, q_b + p_b, q_a)^{-1}(q_b, p_0 + p_b, q_0),$$
$$(p_a, q_b + p_b, q_a)^{-1}(q_a, p_1 + p_a, q_1), \ldots,$$

-continued
$$(p_a, q_b + p_b, q_a)^{-1} q_a, \ldots, (p_a, q_b + p_b, q_a)^{-1}(q_a, p_k + p_a, q_k),$$
$$(p_a, q_b + p_b, q_a)^{-1}(q_a, p_{k+1} + p_a, q_{k+1}), \ldots, (p_a, q_b + p_b, q_a)^{-1} p_a,$$
$$\ldots, (p_a, q_b + p_b, q_a)^{-1}(q_a, p_{N-1} + p_a, q_{N-1})$$

Coefficient Subset Usage

Figure 4:
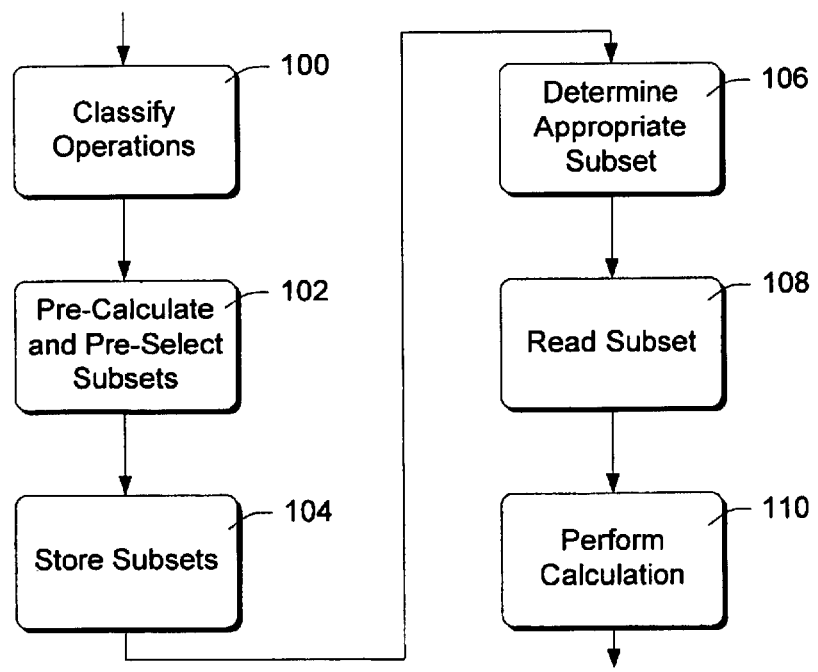
FIG. 4 is a flowchart illustrating preferred steps in accordance with the invention.

FIG. 4 illustrates a method of performing parity operations in accordance with the array storage scheme described above. A first step 100 comprises classifying different parity operations into classifications that include parity segment generation operations, parity segment regeneration operations, and data segment reconstruction operations. More specifically, an operation is classified as either a parity generation operation, a parity regeneration operation resulting from added segments, a parity regeneration operation resulting from segment modification, a single data segment reconstruction operation or a double data segment reconstruction operation. Each classification of parity operations includes a plurality of different classification scenarios, each of which involves a respective subset of parity coefficients.

A step 102 comprises pre-calculating individual parity coefficients and pre-selecting subsets of parity coefficients for use in the different parity operations and the different scenarios of parity operations. This step is performed in accordance with the description already given.

A step 104 comprises storing all of the pre-selected parity coefficient subsets in an indexed linear memory array, where they can be accessed by parity computation logic. This step includes pre-formatting the coefficient subsets so that they can be efficiently utilized by hardware-based parity operation logic. In particular, the individual coefficients of each subset are packed in adjacent bytes or storage units and ordered in a way that is particular to the hardware-based parity operation logic. As a result of this step, the memory array contains a single coefficient subset corresponding to each different computation scenario.

The individual coefficients and the subsets of coefficients are packed with no intervening data elements. The subsets of the array are grouped and ordered as already described, with the coefficient subsets grouped into classification groups by order of their classifications. Within the second classification group, the subsets have varying sizes. In addition, the subsets in the second classification group are sub-grouped by size, and ordered in ascending order according to their lowest-numbered coefficient.

During parity operations, parity operation logic accesses the memory array to obtain the appropriate coefficient subsets for use in the different scenarios of parity operations. Thus, a step 106 comprises determining which of the stored subsets of parity coefficients is needed for a particular parity operation. This step involves determining the classification of the parity operation and a group offset into the linear memory array, indicating the beginning of the classification group corresponding to that parity operation classification. A subset offset is then calculated into the group, to the location of the desired coefficient subset.

Step 106 is straightforward except with regard to the second classification group. As described in detail above, the second classification group contains coefficient subsets of varying lengths or sizes, making it difficult to determine the offset of a particular coefficient subset. However, the inventors have discovered that when the second classification group is arranged as described, having ordered subgroups of same-sized coefficient subsets, an offset to a particular subgroup can be calculated as a function of the size of the coefficient subsets of the sub-group and of N (the largest number of coefficients contained by any sub-group).

Specifically, the offset to a particular sub-group i corresponding to subset size $L_i$ is equal to:

$$((L_i-1)(12N+L_i(3N-2L_i-5))/6)-3(N-1).$$

This formula assumes the presence in each subset of the prepended pair of constants (described above) corresponding to P and Q. L, however, equals b–a. Within the sub-group i, the offset of a particular coefficient subset is equal to $a(L_i+2)$. Thus, the overall offset into the classification group, for a range of coefficients corresponding to $x_a$ through $x_b$, is:

$$(((L_i-1)(12N+L_i(3N-2L_i-5))/6)-3(N-1))+a(L_i+2).$$

The size of the second classification group is given by the following equation:

$$((N-1)(12N+N(3N-2N-5))/6)-3(N-1).$$

After determining the appropriate offset into the memory array, a step 108 is performed of reading the determined parity coefficient subset from memory. Step 110 comprises performing the particular parity operation with the subset of parity coefficients read from memory.

Disk Controller Operation

Figure 5:
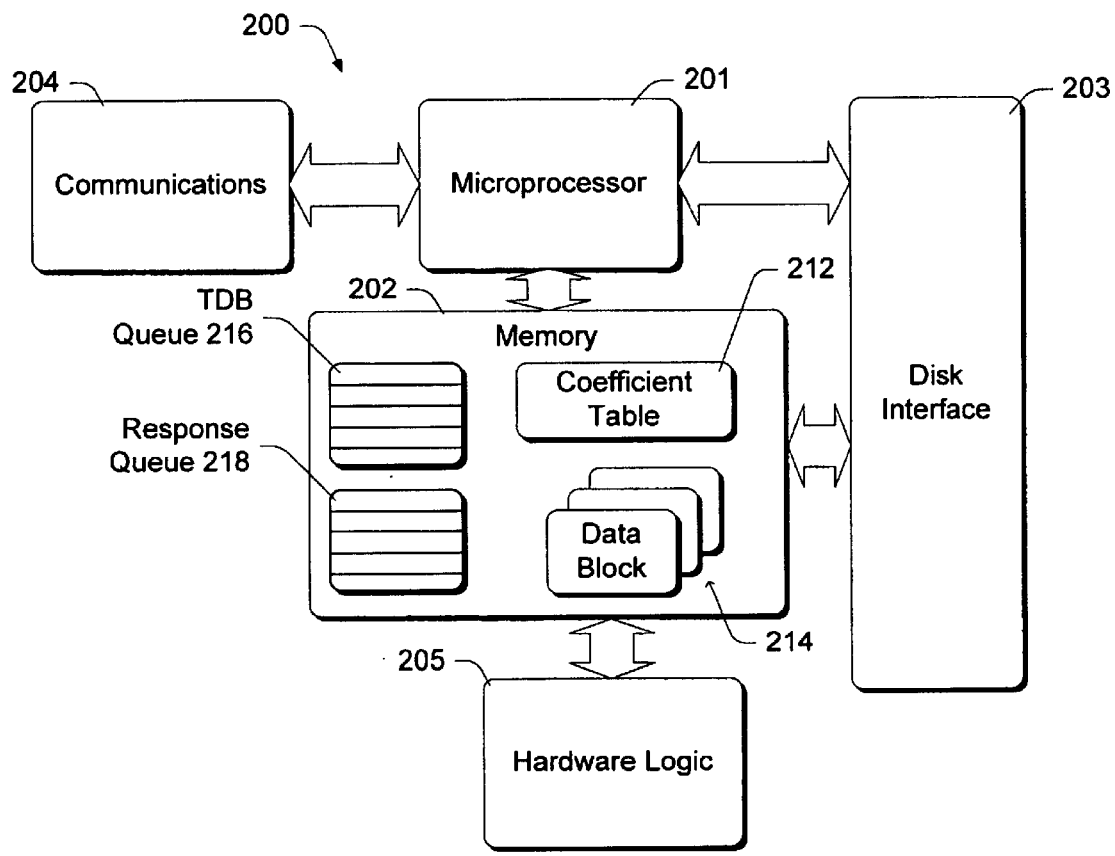
FIG. 5 is a block diagram showing pertinent components of a disk controller in accordance with the invention.

FIG. 5 illustrates the most pertinent components of a disk controller 200 in accordance with the invention. The disk controller includes a microprocessor 201 and associated memory 202. In addition, the disk controller has a hard disk interface component 203 and a communications component 204. The hard disk interface component provides a means of access to the hard disks associated with and controlled by the disk controller. The communications component acts as an interface between a host computer and the hard disk controller.

In addition to these components, hard disk controller 200 includes hardware-based parity operation logic 205 in the form of an application-specific integrated circuit (ASIC). The term "hardware-based" is intended to mean that this logic component, as opposed to software-based logic, does not retrieve and execute instructions from program memory. Rather, the logic component has dedicated, interconnected logic elements that process signals and data. Although hardware-based logic such as this is less flexible than a microprocessor or other instruction-based processors, hardware-based logic is often much faster than instruction-based logic.

In general, the disk controller operates as follows. Microprocessor 201 handles communications with the host computer and coordinates all data transfers to and from the host controller. In addition, the microprocessor coordinates all actual disk transfers. However, data is buffered in memory 202 prior to writing to disk. Parity operations are performed on data in memory 202 under the control of microprocessor 201.

During initialization, microprocessor 201 constructs a coefficient subset table 212 in memory 202. Subsequently, when it is time for a parity operation, microprocessor 201 determines the classification and scenario of the parity operation. Once this information is determined, the microprocessor creates a script that indicates the locations in memory 202 of one or more data segments and parity segments (referred to collectively as data blocks 214) that will be the object of the parity operation. The script indicates an offset into the coefficient subset table 212 at which the proper coefficient subset will be found for the parity operation, and the number of coefficients that are contained in the coefficient subset. The script also indicates the location in memory 202 at which the result of the requested calculation is to be placed. Each script stores information for a single parity operation and the memory structure for storing such scripts is referred to herein as a task description block (TDB). The TDB is stored in a particular location in memory 202 and a pointer to that location (e.g., a 32-bit address) is stored in a TDB queue 216 in memory 202. A response queue 218 is also stored in memory 202 and used by hardware logic 205 to return an indication to microprocessor 201 as to whether a parity operation was successful.

When a script is placed in memory, the hardware logic is notified by the presence of the pointer to the TDB for the script in queue 216. The hardware logic responds by (a) retrieving the designated coefficients, data segments, and parity segments, (b) performing the appropriate parity operation based on the designated coefficients, (c) returning the data and/or calculated parity segments to memory, and (d) indicating to microprocessor 201 whether the operation has been successfully completed by writing an entry into response queue 218.

The hardware logic is configured to perform the various different parity operations by summing products of coefficients and data/parity segments. The different operations actually vary only in the number and choice of coefficients, data segments, and parity segments. These variables are specified by the script. Thus, the operations lend themselves very conveniently to hardware-based calculations.

A simultaneously filed and co-pending U.S. patent application Ser. No. 09/808,713 entitled "Using Task Description Blocks To Maintain Information Regarding Operations", to inventors Barry J. Oldfield and Robert A. Rust, describes TDBs and their use, and is hereby incorporated by reference.

Other simultaneously filed and co-pending U.S. Applications describe technologies useful in conjunction with the invention, including U.S. patent application Ser. No. 09/808,648 now U.S. Pat. No. 6,567,891 entitled "Methods And Arrangements For Improved Strip-Based Processing", to inventors Barry J. Oldfield and Robert A. Rust; U.S. patent application Ser. No. 09/808,711 entitled "Memory Manager for a Common Memory", to inventors Barry J. Oldfield and Robert A. Rust; and U.S. patent application Ser. No. 09/808,910 now U.S. Pat. No. 6,687,872 entitled "Efficient Parity Operations," to inventors Michael B. Jacobson, Barry J. Oldfield and Robert A. Rust. These applications are hereby incorporated by reference.

Conclusion

The parity calculation architecture described above has a number of advantages over the prior art. One significant advantage is that the architecture allows parity computations to be performed by hardware-based logic, without requiring significant complexity in the hardware. To provide this advantage, a microprocessor performs preliminary work such as designating the various parameters to be used in the calculations. Once the proper coefficients and data/parity segments have been designated, the hardware can perform the actual calculations in similar or identical ways, regardless of the particular type of operation that is requested.

The pre-selection of coefficient subsets, and their arrangement in memory, provides further efficiencies by eliminating many steps that would otherwise be required to select coefficients prior to every parity operation. Furthermore, the unique indexing method, particular with regard to the described second section of the array, allows the coefficients to be packed in memory to save space, even though the coefficient subsets have differing lengths.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of performing parity operations in a redundant data storage system that utilizes a plurality of data segments and at least two corresponding parity segments, wherein the parity segments are derived from the data segments and from parity coefficients corresponding to respective data segments, and wherein there are different parity operations involving different subsets of the parity coefficients, the method comprising the following steps:

pre-selecting parity coefficient subsets for use in the different parity operations;

storing all of the pre-selected parity coefficient subsets in a memory; determining which of the stored subsets of parity coefficients is needed for the particular parity operation;

reading the determined subset of parity coefficients from the memory;

performing the particular parity operation with the subset of parity coefficients that was read from the memory.

2. A method as recited in claim 1, wherein:

the storing step comprises pre-formatting the pre-selected parity coefficient subsets in an indexed memory array; and the step of performing the particular parity operation is accomplished by hardware-based parity operation logic that utilizes the subsets of parity coefficients as they are pre-formatted in the memory array.

3. A method as recited in claim 1, further comprising:

classifying the different parity operations into classifications comprising:
parity segment generation operations;
parity segment regeneration operations;
data segment reconstruction operations;

wherein each classification of parity operations includes a plurality of different classification scenarios, each classification scenario involving a respective set of parity coefficients;

wherein the pre-selecting step comprises pre-selecting parity coefficient subsets for each of the different classification scenarios;

wherein the storing step comprises pre-formatting the pre-selected parity coefficient subsets in an indexed memory array; and wherein the step of performing the particular parity operation is accomplished by hardware-based parity operation logic that utilizes the subsets of parity coefficients as they are pre-formatted in the indexed memory array.

4. A method as recited in claim 1, further comprising:

classifying the different parity operations into classifications comprising:
parity segment generation operations;
parity segment regeneration operations;
data segment reconstruction operations;

wherein each classification of parity operations includes a plurality of different classification scenarios, each classification scenario involving a respective subset of parity coefficients;

wherein the pre-selecting step comprises pre-selecting parity coefficient subsets for each of the different classification scenarios;

wherein the storing step comprises grouping the pre-selected parity coefficient subsets in an indexed memory array in accordance with the classifications of the pre-selected parity coefficient subsets.

5. A method as recited in claim 1, further comprising:

classifying the different parity operations into classifications comprising:

parity segment generation operations;
parity segment regeneration operations;
data segment reconstruction operations;

wherein each classification of parity operations includes a plurality of different classification scenarios, each classification scenario involving a respective subset of parity coefficients, the subsets of parity coefficients having varying subset sizes;

wherein the pre-selecting step comprises pre-selecting parity coefficient subsets for each of the different classification scenarios;

grouping the pre-selected parity coefficient subsets into classification groups;

sub-grouping at least one of the classification groups into sub-groups according to subset size;

wherein the storing step comprises packing the pre-selected parity coefficient subsets in an indexed memory array, segregated by group and sub-group.

6. A method as recited in claim 1, wherein the different parity operations include parity regeneration operations that include a plurality of different operation scenarios, each operation scenario involving a respective subset of parity coefficients, the respective subsets containing all possible ranges $P_x$ through $p_y$, of a base set of N parameter coefficients referred to as $P_o$ through $P_{N-1}$, the method further comprising:

forming groups of the subsets according to subset size;

packing the groups of subsets in order of increasing subset size in a linear memory array;

calculating an offset in the linear memory array of a particular group i corresponding to a subset size $L_i$ in accordance with a predefined function of N and $L_i$;

reading a subset of values from the particular group corresponding to the subset size of $L_i$ at the calculated offset in the linear memory array.

7. A method of accessing pre-selected subsets of values, wherein the respective subsets contain all possible ranges $P_x$ through $p_y$ of a base set of N values referred to as $P_o$ through $p_{N-1}$, the method comprising the following steps:

forming groups of the subsets, wherein the groups correspond respectively to different subset sizes;

packing the groups of subsets in order of increasing subset size in a linear memory array;

calculating an offset in the linear memory array of a particular group i corresponding to a subset size $L_i$ in accordance with a predefined function of N and $L_i$;

reading a subset of values from the particular group i at the calculated offset in the linear memory array.

8. A method as recited in claim 7, wherein group i has $N-L_i+1$ subsets of parity coefficients, and wherein the calculating step is performed by evaluating a formula comprising:

$$((L_i-1)(12N+(L_i)(3N-2L_i-5))/6)-3(N-1).$$

9. A method as recited in claim 7, further comprising:

within any individual group i, calculating a memory offset of a subset D in the individual group as a function of subset size $L_i$.

10. A disk controller that performs parity operations in a redundant data storage system that utilizes a plurality of data segments and at least two corresponding parity segments, wherein the parity segments are derived from the data segments and from parity coefficients corresponding to respective data segments, and wherein there are different parity operations involving different subsets of parity coefficients, comprising:

a memory containing stored subsets of parity coefficients corresponding respectively to different parity-related computation scenarios;

hardware parity computation logic configured to any particular parity-related operation by (a) determining the scenario of the operation, (b) reading the corresponding subset of parity coefficients from the memory, and (c) performing the particular parity-related operation with the subset of parity coefficients read from the memory.

11. A disk controller as recited in claim 10, wherein the stored subsets are indexed within the memory.

12. A disk controller as recited in claim 10, wherein:

the parity-related computation scenarios are classified under classifications comprising:
parity segment generation operations;
parity segment regeneration operations;
data segment reconstruction operations;
the stored subsets are grouped in the memory in accordance with the classifications of the corresponding parity-related computation scenarios.

13. A disk controller as recited in claim 10, wherein:
the parity-related computation scenarios are classified under classifications comprising:
panty segment generation operations;
parity segment regeneration operations;
data segment reconstruction operations;
the stored subsets are grouped in the memory into classification groups, in accordance with the classifications of the corresponding parity-related computation scenarios.

* * * * *

UNITED STATES PATENT AND TRADEMARK OFFICE
CERTIFICATE OF CORRECTION

PATENT NO. : 7,062,702 B2  Page 1 of 1
APPLICATION NO. : 09/808710
DATED : June 13, 2006
INVENTOR(S) : Michael B. Jacobson It is certified that error appears in the above-identified patent and that said Letters Patent is hereby corrected as shown below:

In column 1, line 11, delete "Modem," and insert -- Modern, --, therefor.

In column 2, line 64, delete "if" before "FIG. 3".

In column 3, line 59, delete "f($q_0$, $q_a$)$X_0$" and insert -- f($q_0$, $q_a$)$x_0$ --, therefor.

In column 3, line 67, delete "($q_0 x_0 + q x_1 + ...$" and insert -- ($q_0 x_0 + q_1 x_1 + ...$ --, therefor.

In column 6, line 66, delete "$X_a$" and insert -- $x_a$ --, therefor.

In column 7, line 23, delete "f($P_a$)" and insert -- f($p_a$) --, therefor.

In column 7, line 51, delete "$P_b$," and insert -- $p_b$, --, therefor.

In column 7, line 52, delete "$X_a$ or $X_b$," and insert -- $x_a$ or $x_b$, --, therefor.

In column 12, line 25, in Claim 6, delete "$P_x$" and insert -- $p_x$ --, therefor.

In column 12, line 25, in Claim 6, delete "$p_y$," and insert -- $p_y$ --, therefor.

In column 12, line 26, in Claim 6, delete "$P_o$" and insert -- $p_o$ --, therefor.

In column 12, line 26, in Claim 6, delete "$P_{N-1}$," and insert -- $p_{N-1}$, --, therefor.

In column 12, line 38, in Claim 7, delete "$P_x$" and insert -- $p_x$ --, therefor, In column 12, line 39, in Claim 7, delete "$P_o$" and insert -- $p_o$ --, therefor.

In column 14, line 9, in Claim 13, delete "panty" and insert -- parity --, therefor.

Signed and Sealed this

Thirteenth Day of July, 2010

David J. Kappos
*Director of the United States Patent and Trademark Office*